United States Patent
Zhou

(10) Patent No.: US 7,715,656 B2
(45) Date of Patent: May 11, 2010

(54) MAGNIFICATION AND PINCHING OF TWO-DIMENSIONAL IMAGES

(75) Inventor: Mengyao Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 825 days.

(21) Appl. No.: 11/081,400

(22) Filed: Mar. 15, 2005

(65) Prior Publication Data

US 2006/0078226 A1  Apr. 13, 2006

Related U.S. Application Data

(60) Provisional application No. 60/614,214, filed on Sep. 28, 2004.

(51) Int. Cl.
*G06K 9/32* (2006.01)
(52) U.S. Cl. ...................... 382/298; 345/650
(58) Field of Classification Search ................. 382/298, 382/172, 272; 345/650
See application file for complete search history.

(56) References Cited

U.S. PATENT DOCUMENTS

| | | | | |
|---|---|---|---|---|
| 4,599,656 | A * | 7/1986 | Bellinghausen | 382/237 |
| 4,667,250 | A * | 5/1987 | Murai | 358/3.13 |
| 4,790,028 | A * | 12/1988 | Ramage | 382/298 |
| 5,359,513 | A | 10/1993 | Kano et al. | |
| 5,313,533 | A * | 5/1994 | Scott | 382/273 |
| 5,689,287 | A * | 11/1997 | Mackinlay et al. | 345/427 |
| 5,796,876 | A * | 8/1998 | Wang et al. | 382/270 |
| 5,838,838 | A * | 11/1998 | Overton | 382/298 |
| 5,920,655 | A * | 7/1999 | Makita et al. | 382/272 |
| 5,956,418 | A | 9/1999 | Aiger et al. | |
| 5,987,192 | A * | 11/1999 | Maltsev et al. | 382/298 |
| 6,646,626 | B1 * | 11/2003 | Uskali et al. | 345/87 |
| 6,731,284 | B1 | 5/2004 | Ford | |
| 2001/0035975 | A1 * | 11/2001 | Ishii | 358/1.14 |
| 2001/0038390 | A1 | 11/2001 | Takaya et al. | |
| 2004/0252303 | A1 * | 12/2004 | Giorgianni et al. | 356/402 |

FOREIGN PATENT DOCUMENTS

| | | |
|---|---|---|
| JP | 09093486 | 4/1997 |
| JP | 2003250039 | 9/2003 |

(Continued)

OTHER PUBLICATIONS

Photoshop Reflecting Sphere Tutorial, Feb. 2003, http://www.phong.com/tutorials/sphere.*

(Continued)

*Primary Examiner*—Bhavesh M Mehta
*Assistant Examiner*—Stephen R Koziol
(74) *Attorney, Agent, or Firm*—Timothy F. Loomis; Espartaco Diaz Hidalgo

(57) ABSTRACT

In one embodiment, an embedded device is provided which comprises a region of interest defining mechanism to define a region of interest (ROI) within an image. A transformation mechanism of the embedded device applies a nonlinear magnification or pinching transformation to the region of interest such that magnification or pinching within the region of interest varies from a greater amount at a focal point of the region of interest to a lesser amount at an outer border of the region of interest.

41 Claims, 17 Drawing Sheets

FOREIGN PATENT DOCUMENTS

JP            2003-204382        11/2003

OTHER PUBLICATIONS

International Search Report PCT/US05-035098, International Search Authority European Patent Office Jul. 7, 2006.

Written Opinion, PCT/US05-035098, International Search Authority European Patent Office Mar. 28, 2007.

International Preliminary Examination Report, PCT/US05-035098, International Search Authority European Patent Office Apr. 3, 2007.

* cited by examiner

MAGNIFICATION AND PINCHING OF TWO-DIMENSIONAL IMAGES

CROSS REFERENCE TO RELATED APPLICATIONS

Priority is claimed to U.S. Provisional Application No. 60/614,214, filed Sep. 28, 2004.

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

BACKGROUND OF THE DISCLOSURE

The disclosure relates to digital image manipulation in general, and more particularly, to digital image magnification and pinching.

Digital image manipulation describes many different types of modifications and transformations that may be performed on digital images. Examples of image manipulation operations include rotation, magnification, pinching, warping, edge detection, and filtering.

In some applications, operations such as magnification and pinching may help a user to see or appreciate fine details in an image. Rotation may help a user to understand an image from a certain perspective, or may orient an image for a specific use. In other applications, digital image manipulation may be performed for the sake of amusement, for example, pinching or magnifying a portion of an image to change a facial expression in a photograph. Digital image manipulation techniques are also used in industry, in applications including pattern recognition, feature extraction (e.g. in video surveillance and human motion analysis), image restoration, image enhancement, warping/morphing for computer animated sequences, and biomedical image processing.

A number of digital image manipulation techniques are commercially available in the form of photograph editing software. Embedded devices, such as digital cameras and mobile telephones, also have digital image manipulation functionality.

BRIEF SUMMARY OF THE DISCLOSURE

According to one embodiment or aspect of the disclosure, an embedded device is provided which comprises a region of interest defining mechanism to define a region of interest (ROI) within an image. A transformation mechanism of the embedded device applies a nonlinear magnification or pinching transformation to the region of interest such that magnification or pinching within the region of interest varies from a greater amount at a focal point of the region of interest to a lesser amount at an outer border of the region of interest.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
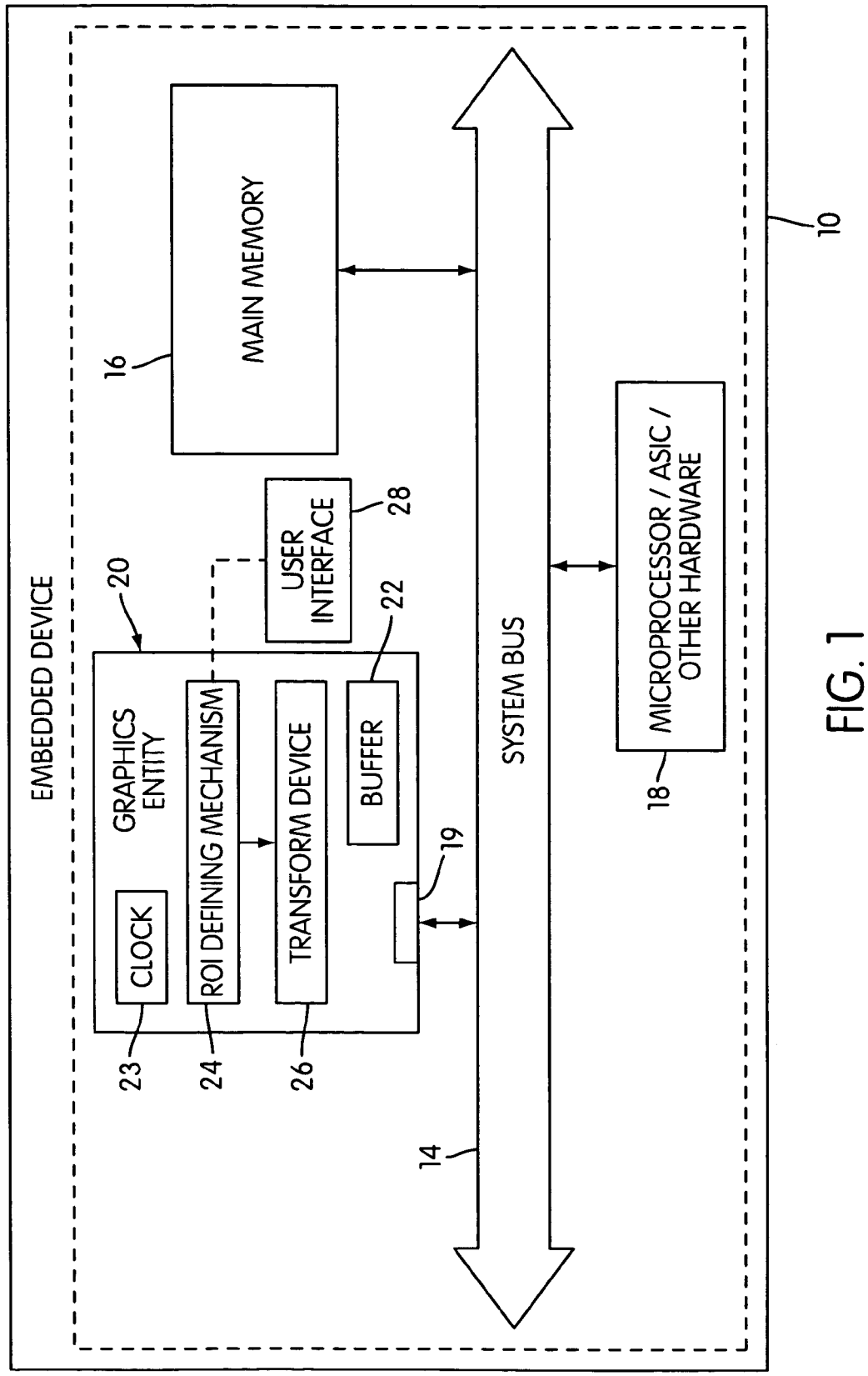
FIG. 1 is a block diagram of an exemplary embedded device capable of performing transformations on an image.

FIG. 1 is a block diagram of an exemplary embedded device 10, which, in the illustrated embodiment, comprises a wireless mobile communication device. The illustrated embedded device 10 comprises a system bus 14, a device memory 16 (which is a main memory in the illustrated device 10) connected to and accessible by other portions of the embedded device 10 through system bus 14, and hardware entities 18 connected to the system bus 14. At least some of the hardware entities 18 perform actions involving access to and use of main memory 16. The hardware entities 18 may include microprocessors, ASICs, and other hardware.

A graphics entity 20 is connected to the system bus 14. The graphics entity 20 may comprise a core or portion of a larger integrated system (e.g., a system on a chip (SoC)), or it may comprise a graphics chip, such as a graphics accelerator. In the illustrated embodiment, the graphics entity 20 comprises a graphics pipeline (not shown), a graphics clock 23, a buffer 22, and a bus interface 19 to interface graphics entity 20 with system bus 14.

Buffer 22 holds data used in per-pixel processing by graphics entity 20. Buffer 22 provides local storage of pixel-related data, such as pixel information from buffers (not shown) within main memory 16.

In the illustrated embodiment, graphics entity 20 is capable of performing localized image transformations on portions of images. To that end, graphics entity 20 includes a region of interest defining mechanism 24 to display and allow a user to select a region of interest within an image to be transformed and a transformation device 26 to perform the image transformation. As shown, the region of interest defining mechanism 24 is coupled to the user interface 28 of the embedded device 10. The image transformations that may be performed by embedded device 10 will be described in greater detail below. The image on which the embedded device 10 operates may be stored in the main memory 16 of the embedded device 10, the buffer 22 of the embedded device, or on another machine-readable medium interoperable with the embedded device. Additionally, although the graphics entity 20 performs the transformation functions in the illustrated embodiment, in other embodiments, those functions may be performed by the other hardware 18.

Figure 2:
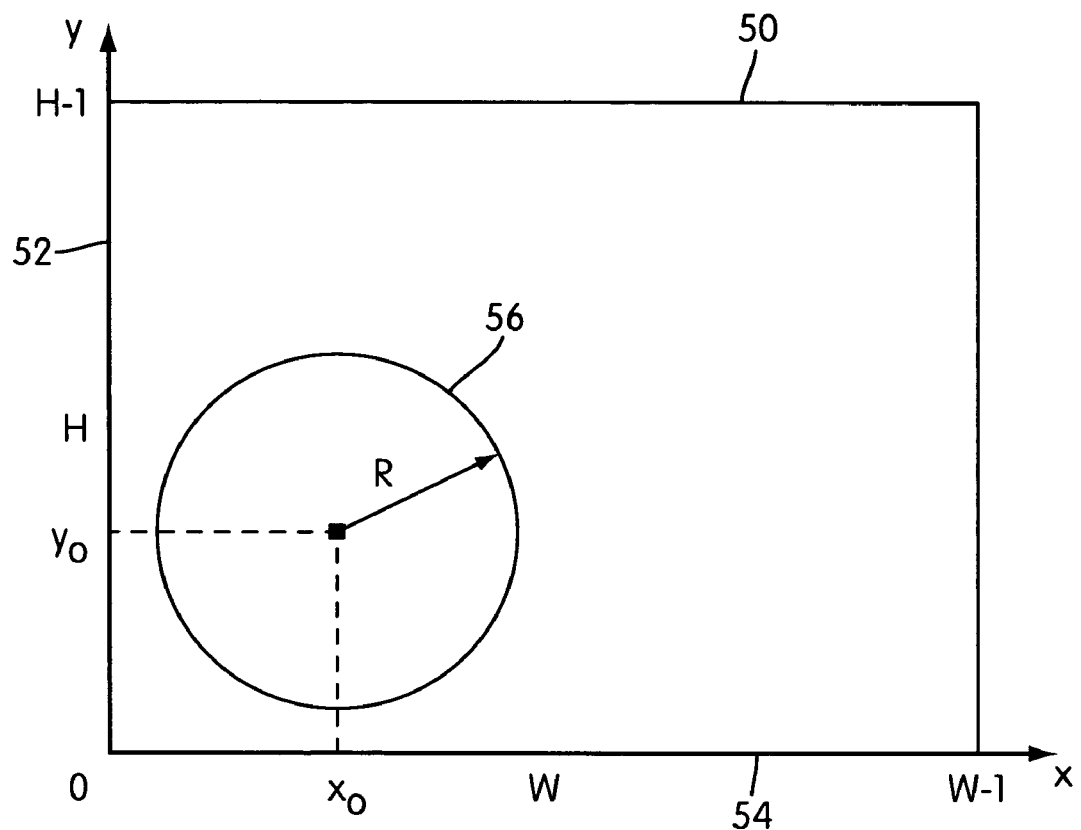
FIG. 2 is a schematic illustration of an image with an identified region of interest for transformation.

FIG. 2 is a schematic illustration of an image 50. The image 50 has a width W and a height H. In the illustrated embodiment, the width W and height H are expressed in units of pixels, although other measurement units may be used. The height H of the image 50 extends along the y-axis 52 in FIG. 2, and the width W of the image extends along the x-axis 54. In FIG. 2, the width coordinates of the image 50 extend from 0 to W-1 and the height coordinates extend from 0 to H-1, as shown.

Image 50 may originally be created in a number of ways, including digital photography, film photography followed by digitization, digitization from a non-photographic source, and pure digital illustration/rendering. Particular implementations of the image transformation methods presented here on specific types of images and specific platforms or computing systems will be described in greater detail below.

Transformation methods illustrated herein provide for localized transformation of an image. As shown in FIG. 2, the transformation may be localized using a defined region of interest 56, such as, for example, a circular region of radius R centered at $(x_o, y_o)$. More specifically, the transformation may be localized by limiting it to the area within the region of interest 56. The center coordinates $(x_o, y_o)$ of the circular region 56 may be arbitrarily selected, and the entire circle need not be located within the bounds of the image. Although the region of interest 56 is illustrated as a circle, it need not be a circle, and may vary in shape and dimensions. Regions of interest of other shapes will be described in more detail below.

Most image transformations can be described as sets of mathematical transformation functions represented by sets of mathematical equations; these equations are descriptive of the operations being performed on the image regardless of the particular platform on which the transformations are implemented. The mathematical equations describing one exemplary set of transformation functions for the illustrated embodiment are given below as Equations (1) and (2). For each pixel in image 50:

In Equations (1) and (2), $(x_{in}, y_{in})$ is the input pixel location, $(x_{out}, y_{out})$ is the output pixel location, and the parameters a and k control the type of distortion (i.e., magnification or pinching) and the level of magnification or pinching. The parameter a can take a value between zero and infinity; the parameter k can take a value between negative infinity and infinity. (The effect of varying the parameters a and k will be described in greater detail below with respect to certain examples.) As Equations (1) and (2) state, pixels within the region of interest 56, which is circular in this embodiment, are transformed, while for all other pixels, the output is the same as the input.

The parameter a, as given in Equations (1) and (2), has effects on both the magnitude and type of distortion. While Equations (1) and (2) may be directly applied in some circumstances, it is useful to separate the magnitude effects of the parameter a from its effects on the type of distortion. This can be done by restricting the permissible values of parameter a to values between one and infinity and introducing a separate binary parameter m that determines whether the distortion is magnification (m=0) or pinching (m=1). Equations (3) and (4) illustrate the use of the binary parameter m:

$$x_{out} = \begin{cases} x_o + (x_{in} - x_o) \cdot a^{(-1)^m \cdot \left[1 - \frac{(x_{in} - x_o)^2 + (y_{in} - y_o)^2}{R^2}\right]^k} & \text{for} \quad (x_{in} - x_o)^2 + (y_{in} - y_o)^2 \leq R^2 \\ x_{in} & \text{otherwise} \end{cases} \quad (3)$$

$$y_{out} = \begin{cases} y_o + (y_{in} - y_o) \cdot a^{(-1)^m \cdot \left[1 - \frac{(x_{in} - x_o)^2 + (y_{in} - y_o)^2}{R^2}\right]^k} & \text{for} \quad (x_{in} - x_o)^2 + (y_{in} - y_o)^2 \leq R^2 \\ y_{in} & \text{otherwise} \end{cases} \quad (4)$$

Equations (3) and (4) are identical in effect to Equations (1) and (2), taking into account the mathematical identity:

$$a^{-\left[1 - \frac{(x_{in} - x_o)^2 + (y_{in} - y_o)^2}{R^2}\right]^k} = \left(\frac{1}{a}\right)^{\left[1 - \frac{(x_{in} - x_o)^2 + (y_{in} - y_o)^2}{R^2}\right]^k} \quad (5)$$

If a varies in the range $1 \leq a \leq \infty$, $$\frac{1}{a} = a^{-1}$$

varies in the range $$0 < \frac{1}{a} < 1.$$

$$x_{out} = \begin{cases} x_o + (x_{in} - x_o) \cdot a^{\left[1 - \frac{(x_{in} - x_o)^2 + (y_{in} - y_o)^2}{R^2}\right]^k} & \text{for} \quad (x_{in} - x_o)^2 + (y_{in} - y_o)^2 \leq R^2 \\ x_{in} & \text{otherwise} \end{cases} \quad (1)$$

$$y_{out} = \begin{cases} y_o + (y_{in} - y_o) \cdot a^{\left[1 - \frac{(x_{in} - x_o)^2 + (y_{in} - y_o)^2}{R^2}\right]^k} & \text{for} \quad (x_{in} - x_o)^2 + (y_{in} - y_o)^2 \leq R^2 \\ y_{in} & \text{otherwise} \end{cases} \quad (2)$$

Thus, if a is restricted to the range $1 \leq a \leq \infty$ and a negative exponent is used by setting m=1 in Equations (3) and (4), it is equivalent to varying a in the range $0<a<1$ in the original transformation functions. Alternatively, setting m=0 to get a positive exponent in Equations (3) and (4) is equivalent to varying a in the range $1 \leq a \leq \infty$ in the original transformation functions. By adjusting the value of m, the new transformation functions cover the same range of a as the original transformation functions.

Equations (1)-(4) perform the transformation, whatever its parameters, in both the horizontal and vertical directions. In an alternate embodiment, the transformation may be applied in only one direction. In that case, an exemplary set of transformation functions for one dimensional transformation along the horizontal are:

$$x_{out} = \begin{cases} x_o + (x_{in} - x_o) \cdot a^{(-1)^m \cdot \left[1 - \frac{(x_{in}-x_o)^2}{d^2}\right]^k} & \text{for} \quad |x_{in} - x_o| \leq d \\ x_{in} & \text{otherwise} \end{cases} \quad (6)$$

$$y_{out} = y_{in} \quad (7)$$

and an exemplary set of transformation functions for the one dimensional transformation along the vertical are:

$$x_{out} = x_{in} \quad (8)$$

$$y_{out} = \begin{cases} y_o + (y_{in} - y_o) \cdot a^{(-1)^m \cdot \left[1 - \frac{(y_{in}-y_o)^2}{d^2}\right]^k} & \text{for} \quad |y_{in} - y_o| \leq d \\ y_{in} & \text{otherwise} \end{cases} \quad (9)$$

in which d is half the width or height of the region of interest. The effect of transformation Equations (3) and (4) and the values of parameters a, k, and m are better understood in view of the following two examples.

EXAMPLE 1 a=2, k=1, m=0

When the three parameters in Equations (3) and (4) are set as indicated above, Equations (3) and (4) reduce to:

Equations (10) and (11) produce a magnified image with a maximum magnification power of two. At the center of the region of interest 56, where $(x_{in}, y_{in})=(x_o, y_o)$, the exponential term is equal to two; therefore, the center is magnified by a factor of two. However, at the edge of the region of interest 56, where $(x_{in}-x_o)^2+(y_{in}-y_o)^2=R^2$, the exponential term equals one; therefore, pixels along the edge are unmagnified. The overall effect of Equations (10) and (11) is to provide a magnification power of two at the center of the region of interest 56 which gradually decreases as the distance from the center of the region of interest 56 increases.

Figure 3:
FIG. 3 is an original size 520×390 pixel image before transformation using the illustrated method.
Figure 4:
FIGS. 4-16 illustrate the image of FIG. 3 as transformed according to the illustrated embodiments using various parameters for the transformations.

FIG. 3 is an image in RGB format with an original image size of 520×390 pixels. FIG. 4 is the transformed image of FIG. 3, illustrating the application of Equations (10) and (11) using the parameters of Example 1 with a magnification radius of 100 pixels.

EXAMPLE 2 a=2, k=1, m=1

When the three parameters in Equations (3) and (4) are set as indicated above, Equations (3) and (4) reduce to:

$$x_{out} = \begin{cases} x_o + (x_{in} - x_o) \cdot 2^{\left[1 - \frac{(x_{in}-x_o)^2+(y_{in}-y_o)^2}{R^2}\right]} & \text{for} \quad (x_{in}-x_o)^2 + (y_{in}-y_o)^2 \leq R^2 \\ x_{in} & \text{otherwise} \end{cases} \quad (10)$$

$$y_{out} = \begin{cases} y_o(y_{in} - y_o) \cdot 2^{\left[1 - \frac{(x_{in}-x_o)^2+(y_{in}-y_o)^2}{R^2}\right]} & \text{for} \quad (x_{in}-x_o)^2 + (y_{in}-y_o)^2 \leq R^2 \\ y_{in} & \text{otherwise} \end{cases} \quad (11)$$

$$x_{out} = \begin{cases} x_o + (x_{in} - x_o) \cdot 2^{-\left[1 - \frac{(x_{in}-x_o)^2 + (y_{in}-y_o)^2}{R^2}\right]} & \text{for} \quad (x_{in} - x_o)^2 + (y_{in} - y_o)^2 \leq R^2 \\ x_{in} & \text{otherwise} \end{cases} \quad (12)$$

$$y_{out} = \begin{cases} y_o + (y_{in} - y_o) \cdot 2^{-\left[1 - \frac{(x_{in}-x_o)^2 + (y_{in}-y_o)^2}{R^2}\right]} & \text{for} \quad (x_{in} - x_o)^2 + (y_{in} - y_o)^2 \leq R^2 \\ x_{in} & \text{otherwise} \end{cases} \quad (13)$$

Figure 12:

Equations (12) and (13) produce a locally pinched image with a maximum pinching factor of two. At the center of the region of interest 56, the exponential term is equal to one half; therefore, the center is pinched by a factor of two. At the edge of the region of interest 56, the exponential term is equal to one; therefore, pixels at the edge of the region of interest 56 are unpinched. The overall effect of Equations (12) and (13) is to provide a pinching power of two at the center of the region of interest 56 which gradually decreases as the distance from the center of the region of interest 56 increases. FIG. 12 illustrates an image transformed with these paramaters.

Table 1 below presents the results of several additional examples, illustrating the use and selection of the parameters a, k, and m for Equations (3) and (4). All of the examples presented below used nearest-neighbor pixel duplication, although other methods, such as interpolation, could be used to fill in pixels in the magnified images. The image size and the radius and location of the region of interest in the examples presented below are the same as those in Examples 1 and 2. In Table 1, certain examples are duplicative of others, but are presented nonetheless for ease of reference.

TABLE 1

Examples

Figure 5:
Figure 6:
Figure 7:
Figure 8:
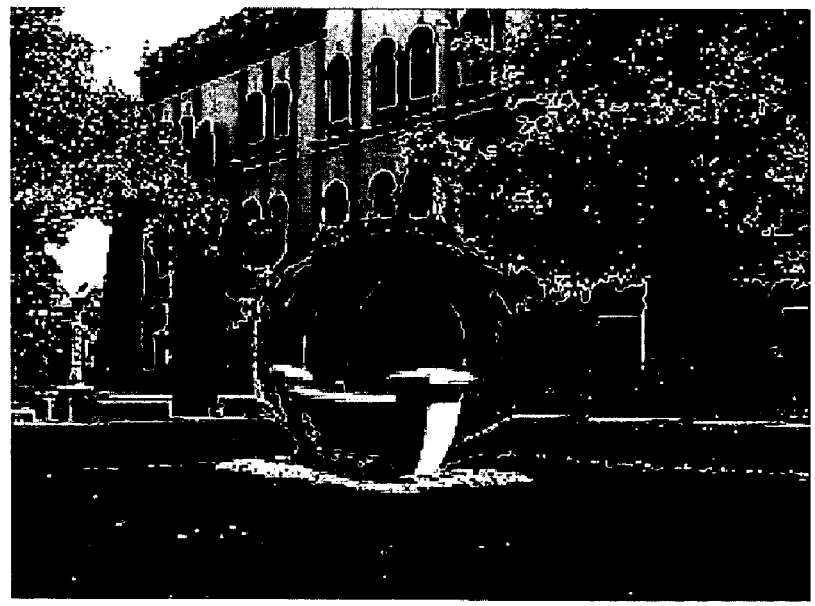
Figure 9:
Figure 10:
Figure 11:
Figure 13:
Figure 14:
Figure 15:
Figure 16:

| Example No. | a | k | m | Result Figure |
|---|---|---|---|---|
| 1 | 2 | 1 | 0 | FIG. 4 |
| 2 | 2 | 1 | 1 | FIG. 12 |
| 3 | 1.5 | 1 | 0 | FIG. 5 |
| 4 | 3 | 1 | 0 | FIG. 6 |
| 5 | 2 | 1.5 | 0 | FIG. 7 |
| 6 | 2 | 2 | 0 | FIG. 8 |
| 7 | 2 | 3 | 0 | FIG. 9 |
| 8 | 1 | 1 | 1 | FIG. 10 (same as the untransformed image of FIG. 3) |
| 9 | 1.5 | 1 | 1 | FIG. 11 |
| 10 (same as Example 2) | 2 | 1 | 1 | FIG. 12 |
| 11 | 3 | 1 | 1 | FIG. 13 |
| 12 | 2 | 1.5 | 1 | FIG. 14 |
| 13 | 2 | 2 | 1 | FIG. 15 |
| 14 | 2 | 3 | 1 | FIG. 16 |

In general, the examples presented above show that as the value of the paramater k increases with the values of a and m held constant, the transition between the point of greatest magnification or pinching and the points of least magnification or pinching becomes smoother and more gradual. Thus, the parameter k can be interpreted as determining the size and the degree of distortion of the transition region between the most and least distorted areas of the image.

The examples presented above also show that as the value of parameter a inscreases with the values of k and m held constant, the maximum power of magnification or pinching increases.

Table 1 shows the effect of varying the parameters a, k, and m on the transformed image. However, there are two cases in which the output image is the same as the input image. The first case is when a=1, k=1, and m=0. The second case is when a=1, k=1, and m=1.

In addition to the examples presented above, certain comparative examples were prepared using the image editing program ADOBE PHOTOSHOP® and its SPHERIZE and PINCH operations. Six cases could be approximated using the conventional software. These are presented in Table 2.

TABLE 2

Comparative Examples

Figure 17:
FIGS. 17-22 illustrate the image of FIG. 3 as transformed by prior art image transformation methods.
Figure 18:
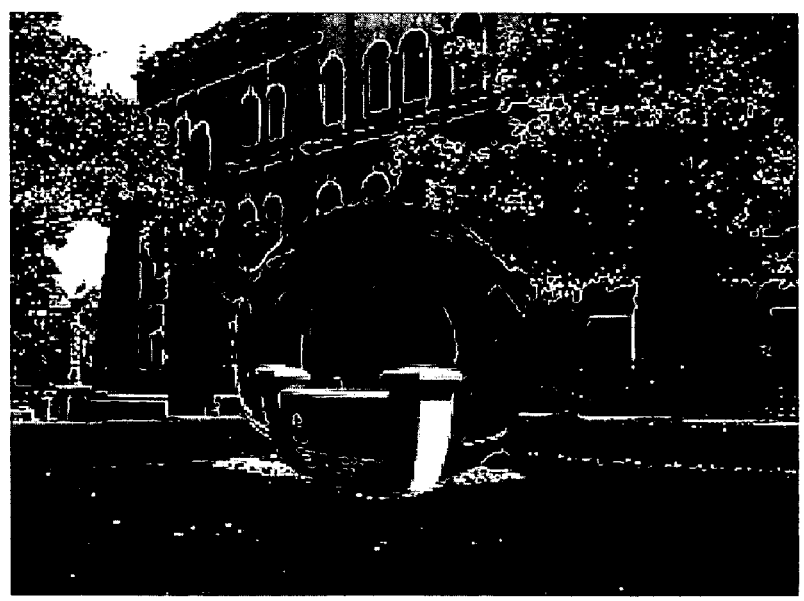
Figure 19:
Figure 20:
Figure 21:
Figure 22:

| Comparative Example No. | PHOTOSHOP ® Operations | Figure | Compare to Example |
|---|---|---|---|
| C1 | SPHERIZE 100%, then 75% | FIG. 17 | Example 1 (a = 2, k = 1, m = 0) |
| C2 | SPHERIZE 100%, then 38% | FIG. 18 | Example 5 (a = 2, k = 1.5, m = 0) |
| C3 | SPHERIZE 90% | FIG. 19 | Example 3 (a = 1.5, k = 1, m = 0) |
| C4 | PINCH 90% | FIG. 20 | Example 10 (a = 2, k = 1, m = 1) |
| C5 | PINCH 70% | FIG. 21 | Example 12 (a = 2, k = 1.5, m = 1) |
| C6 | PINCH 50% | FIG. 22 | Example 9 (a = 1.5, k = 1, m = 1) |

Two out of the six comparative examples, Examples C1 and C2, required two PHOTOSHOP® operations to produce a comparable effect. (Although comparable, the effect created by the PHOTOSHOP® software was not identical, as can be seen from the figures.) Thus, one advantage of these transformation methods is that fewer transformation operations may be required to produce a desired effect. These transformation methods also appear to provide slightly more magnification and pinching at the center of the transformation region.

In the examples above, all of which used Equations (3) and (4), the area on which the transformation is performed is circular. However, the area of the transformation need not be circular, and may be chosen depending on the application, provided that appropriate equations are used for the transformation. For example, Equations (14) and (15) below provide for a transformation in an elliptical area. In Equations (14) and (15), two additional parameters, b and c, describe the major and minor axes of the ellipse, i.e., its width and height. (However, the parameters b and c do not themselves equal the major and minor axes of the ellipse. The major axis is equal to 2bR and the minor axis is equal to 2cR.)

$$x_{out} = \begin{cases} x_o + (x_{in} - x_o) \cdot a^{(-1)^m \cdot \left[1 - \frac{b(x_{in}-x_o)^2 + c(y_{in}-y_o)^2}{R^2}\right]^k} & \text{for} \quad b(x_{in}-x_o)^2 + c(y_{in}-y_o)^2 \leq R^2 \\ x_{in} & \text{otherwise} \end{cases} \quad (14)$$

$$y_{out} = \begin{cases} y_o + (y_{in} - y_o) \cdot a^{(-1)^m \cdot \left[1 - \frac{b(x_{in}-x_o)^2 + c(y_{in}-y_o)^2}{R^2}\right]^k} & \text{for} \quad b(x_{in}-x_o)^2 + c(y_{in}-y_o)^2 \leq R^2 \\ y_{in} & \text{otherwise} \end{cases} \quad (15)$$

In embodiments in which the area of transformation or region of interest is not a geometric shape with an easily located center, an arbitrary focal point may be chosen. Even where the region of interest 56 has an easily located geometric center, a different (not co-located) focal point may be chosen.

The illustrated transformation methods may be implemented to run on a computing system of limited capabilities, such as an integer microprocessor. Integer microprocessors are commonly used on mobile devices, such as mobile telephones, mobile telephones with digital cameras, and other portable computing devices. While integer microprocessors typically include a floating-point (i.e., decimal) mathematics emulator, it can be more time consuming and computationally expensive to use the emulator. The transformations may be implemented using integer arithmetic.

When implementing transformation equations such as Equations (3) and (4) on an integer microprocessor, two considerations arise: the calculation of the power functions in those equations using only integer arithmetic, and the ordering of operations so as to avoid integer overflow (i.e., the condition in which a calculated number exceeds the largest integer that the microprocessor can handle).

Figure 23:
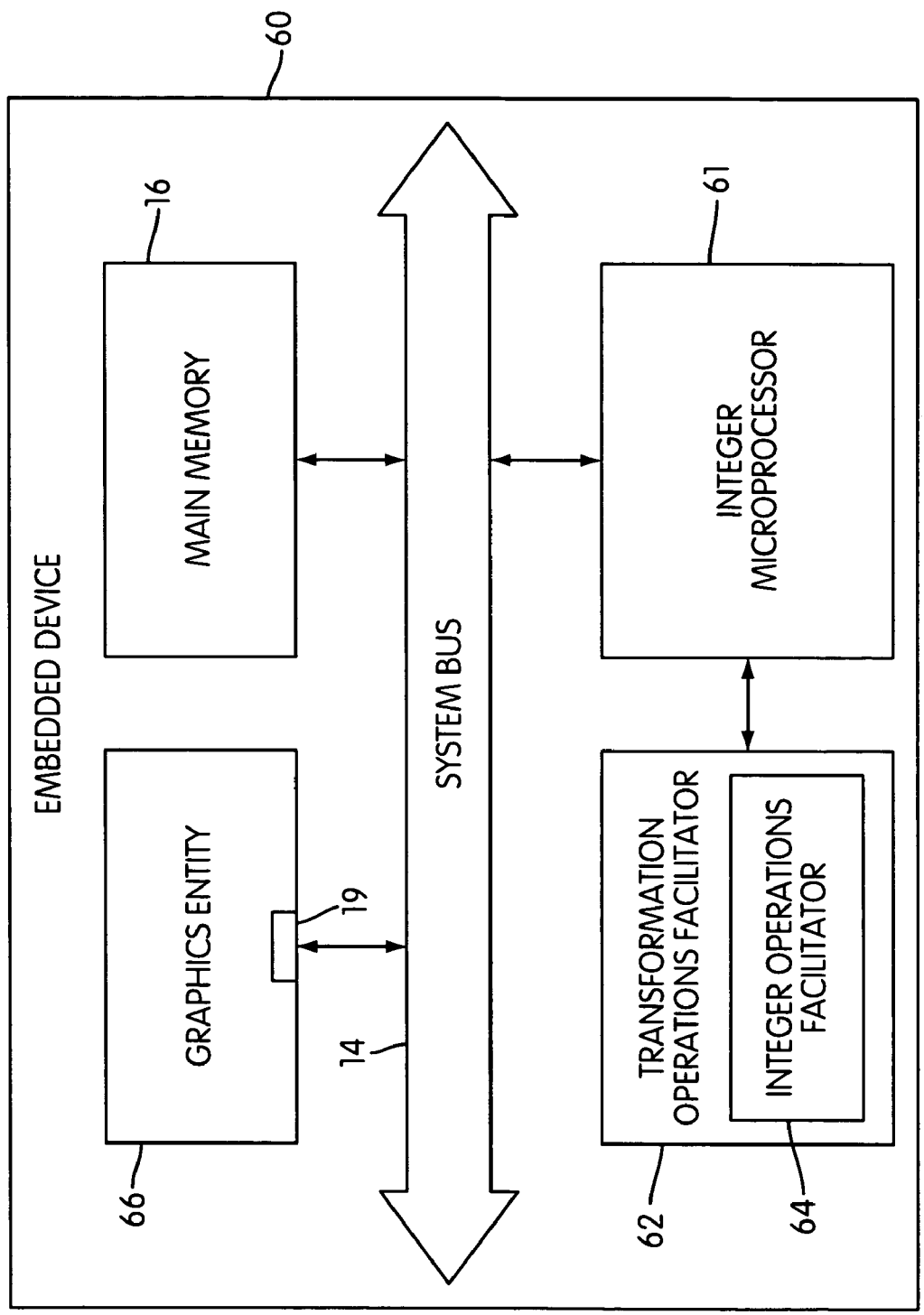
FIG. 23 is a block diagram of an exemplary embedded device with an integer microprocessor capable of performing transformations on images.

FIG. 23 is a block diagram of an exemplary embedded device 60 that is adapted to perform the transformations described above using integer arithmetic. The embedded device 60 includes a main memory 16 connected to a system bus 14, a graphics entity 66 connected by an interface 19 to the system bus 14, and a integer microprocessor 61 connected to the system bus 14. Embedded device 60 also includes a transformation operations facilitator 62 connected to the microprocessor. An integer operations facilitator 64 is included within the transformation operations facilitator 62.

The transformation operations facilitator 62 calculates the power functions of Equations (3) and (4) and performs the other transformation operations in a manner compatible with the microprocessor 61. The integer operations facilitator 64 ensures that all of the necessary calculations are performed using integer arithmetic with an order of calculation that avoids integer overflow in the integer microprocessor 61. (The functions of both components 62, 64 and the calculations that are performed will be described below in more detail.) An advantage of an embedded device such as device 60 is that no floating-point emulator is used, which makes the transformations more efficient on the integer microprocessor 61. The transformation operations facilitator 62 and the integer operations facilitator 64 may be implemented in hardware, in software, in some combination of hardware and software, or in any other way compatible with the microprocessor 61.

Although illustrated in FIG. 23, the graphics entity 66 need not be included in embedded device 60.

In order to calculate the power functions in Equations (3) and (4), in the illustrated embodiment, a Taylor series expansion of the function is used. For an arbitrary power function, the Taylor series expansion is given by Equation (16):

$$a^n = 1 + (\ln a)n + \frac{(\ln a)^2}{2!}n^2 + \frac{(\ln a)^3}{3!}n^3 + \ldots + \frac{(\ln a)^k}{k!}n^k + \ldots \quad (16)$$

As in any use of a Taylor series, the approximation becomes more accurate as more terms are added. However, the more terms of a Taylor series that are used, the more computationally expensive the process becomes. Additionally, successive terms of a Taylor series add ever more diminishing amounts of accuracy to the final result. Therefore, the number of Taylor series terms that are used to calculate the power function will depend on the accuracy desired as well as the computing power available. In one implementation, which will be described below in greater detail, the first four terms of the Taylor series were found to provide sufficient accuracy without requiring undue computing power. Using the first four terms of the series with a=2, Equation (16) above reduces to Equation (17):

$$2^n \cong 1 + (\ln 2)n + \frac{(\ln 2)^2}{2!}n^2 + \frac{(\ln 2)^3}{3!}n^3 \quad (17)$$

Although Equation (17) does not contain strictly integer terms, the non-integer terms can be converted to integers for the purpose of performing the calculations. For example, the natural logarithm of 2 can be multiplied by $2^{23}$ (i.e., shifted 23 bits to the left) to result in the integer 5767168. The results of the calculations can subsequently be shifted back (i.e., divided by $2^{23}$) to remove the effect of the multiplier. In general, large factors of 2 are used to preserve accuracy by preserving a number of significant digits; smaller factors may be used if less accuracy is desired. Additionally, although any large integer factor can be used when converting floating-point numbers to integers, factors of 2 are used in the illustrated embodiment so that relatively slow multiplication operations can be replaced by relatively fast bit-shifting operations.

A sample of the implementation code for a 32-bit microprocessor using the four-term Taylor series expansion of Equation (17) and a $2^{23}$ integer conversion multiplier for the magnification operation is as follows for the case in which a=2, k=1, and m=0:

```
int32 r, xo, yo, xin, xout, yin, yout, rSq, k1, k2, xy, factor;
    rSq = r * r;
    k1 = 5767168 / r;
    k2 = 2048 / r;
    xy = (xin - xo) * (xin - xo) + (yin - yo) * (yin - yo);
```

```
      factor = 8388608 + (5767168 − (xy * k1) / r) +
           (2048 − (xy * k2) / r) * (1024 − ((xy * k2) >> 1) / r)
  +
           (128 − (xy * 128) / rSq) * (64 − (xy * 64) / rSq) *
           (64 − (xy * 64) / rSq);
      xout = xo + ((factor * (xin − xo)) >> 23);
      yout = yo + ((factor * (yin − yo)) >> 23);
```

In the above code snippet, 8388608 is $1 \times 2^{23}$, and the operations are ordered so as to avoid integer overflow on the 32-bit microprocessor. The value of the Taylor series is calculated as a multiplicative factor, is multiplied by the difference between the location of the input pixel and the center of the transformation region, and is added to the location of the center of the transformation region. A shifting operation at the end removes the effect of the $2^{23}$ multiplier. These operations are performed on each input pixel in the region of interest.

In general, the difference between the magnification and pinching transformations lies in the sign (i.e., addition versus subtraction) of certain operations. The code for the pinching operation for the case in which a=2, k=1, and m=1 is as follows:

```
      int32 r, xo, yo, xin, xout, yin, yout, rSq, k1, k2, xy, factor;
         rSq = r * r;
         k1 = 5767168 / r;
         k2 = 2048 / r;
         xy = (xin − xo) * (xin − xo) + (yin − yo) * (yin − yo);
         factor = 8388608 − (5767168 − (xy * k1) / r) +
              (2048 − (xy * k2) / r) * (1024 − ((xy * k2 ) >> 1) / r)
   −
              (128 − (xy * 128) / rSq) * (64 − (xy * 64) / rSq) *
              (64 − (xy * 64) / rSq);
         xout = xo + ((factor * (xin − xo)) >> 23);
         yout = yo + ((factor * (yin − yo)) >> 23);
```

The above code snippets were found to provide real-time results on an ARM926EJ-S 32-bit integer microprocessor. Although this described embodiment is coded in C and implemented on a 32-bit microprocessor, other embodiments may be coded in any programming language, including C, C++, Java, J++, and assembler, may be implemented on microprocessors of any capabilities, including 64-bit microprocessors and 128-bit microprocessors, and may use any values of the parameters a, k, and m. The implementations need not use integer-only arithmetic and need not be ordered so as to avoid integer overflow. If these methods are implemented on an integer microprocessor, they may be provided as image processing functions on a mobile telephone with a digital camera or other portable electronic devices. It should also be understood that these methods may be implemented in software, hardware or any combination of software and hardware on a microprocessor, an ASIC, or any other platform with sufficient computing capability to implement them.

Figure 24:
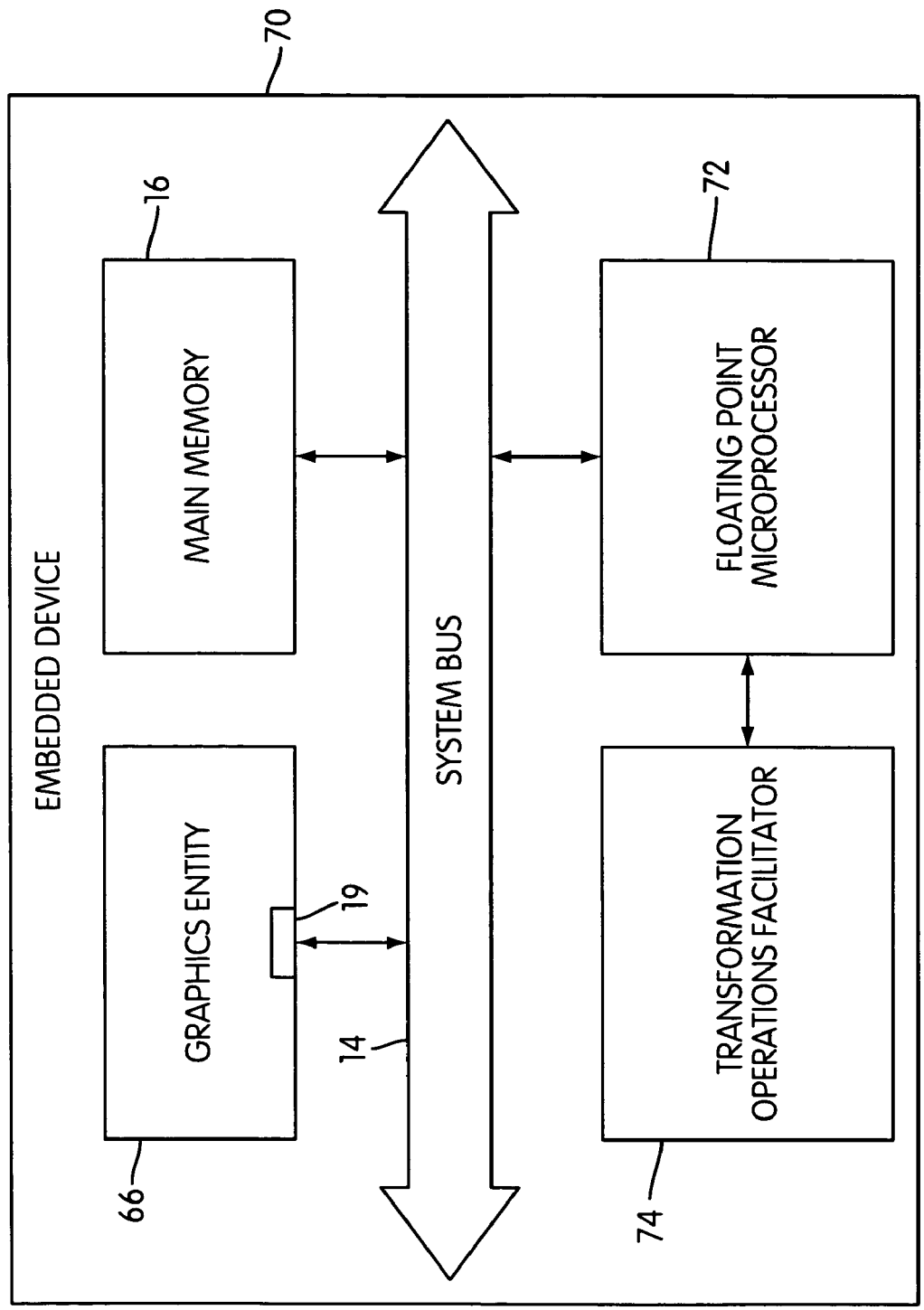
FIG. 24 is a block diagram of an exemplary embedded device with a floating-point microprocessor capable of performing transformations on images.

FIG. 24 a block diagram of an exemplary embedded device 70 that is adapted to perform the transformations described above using floating-point arithmetic. The components of embedded device 70 are generally similar to those of embedded device 60, and thus, the description above will suffice with respect to the similar components. Unlike embedded device 60, embedded device 70 includes a floating-point microprocessor 72. Embedded device 70 also includes a transformation operations facilitator 74 coupled to the floating-point microprocessor 72, but the transformation operations facilitator 74 has no integer operations facilitator. Calculations are performed in embedded device 70 using floating-point numbers, omitting, for example, the tasks of converting the terms of Equations (3) and (4) to integers. Although an integer-only implementation of the illustrated transformation methods would function correctly if performed on embedded device 70, it is advantageous to make use of the floating-point capabilities of microprocessor 72.

Figure 25:
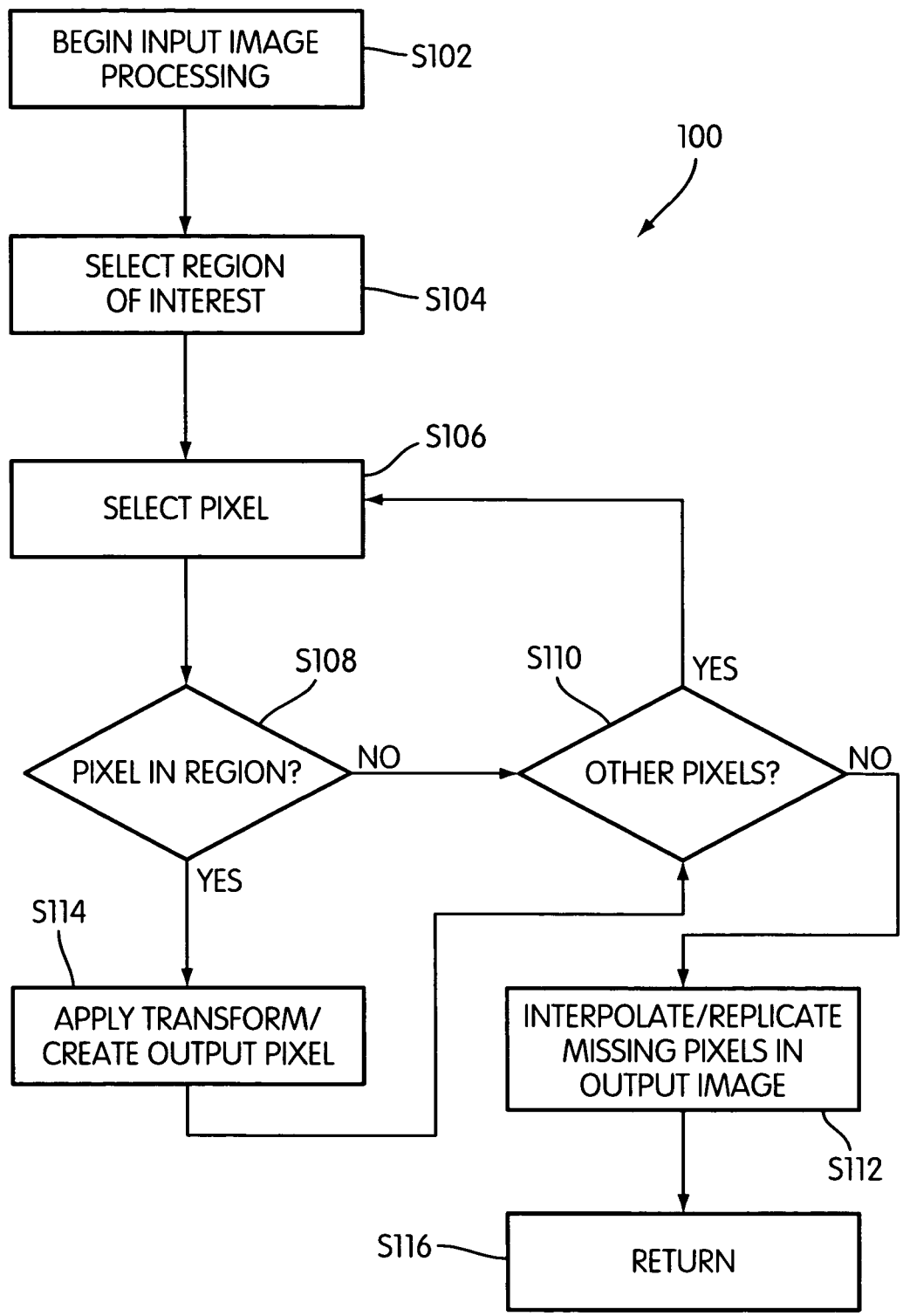
FIG. 25 is a schematic flow diagram illustrating the tasks involved in an implementation of the transformation methods.

FIG. 25 is a more general flow diagram illustrating a method 100 for applying localized magnification or pinching to an image. Method 100 may be implemented on any platform capable of performing the necessary calculations.

Method 100 begins with input image processing at S102 and control passes to S104. In S104, the region of interest in the input image is selected. The region of interest is typically defined by a geometric shape (such as the circles and ellipses described above), although an arbitrary geometric region may be used if the transform calculations are modified appropriately. In S104, the user would select the center and radius or other dimensions of the region of interest. Once the region of interest is selected, method 100 continues with S106, in which a pixel of the input image is selected. Following S106, method 100 continues with S108, a decision task in which it is determined whether or not the selected pixel is in the region of interest. If the selected pixel is in the region of interest (S108:YES), that pixel is transformed at S114 by performing one or more of the operations described above and a resulting output pixel of an output image is generated. If the selected pixel is not in the region of interest (S108:NO), control of method 100 is transferred to S110, in which it is determined whether there are other pixels remaining in the input image. If there are other pixels remaining in the image (S110:YES), control of method 100 returns to S106. If there are no other pixels remaining in the image (S110:NO), control passes to S112. In S112, any interpolation or replication of missing pixels in the output image necessary to create a complete transformed output image may be performed. (In the simplest cases, any necessary pixel replication may be performed by nearest neighbor duplication.) Any other tasks required to create a whole, viewable image may also be performed at S112, including the writing of header information for the output image file. Once S112 is complete, method 100 terminates and returns at S116.

In some of the foregoing description, it has been assumed that the image to be transformed is in the RGB (red-green-blue) format, in which each image pixel has a value for the red content of that pixel, a value for the green content, and a value for the blue content. However, the illustrated transformation methods can be used directly on other image formats without first converting to RGB. This is advantageous because although RGB-format images are relatively easy to transform, they are more difficult to compress, and generally consume more storage space.

Two other common image formats are YCbCr and YCrCb. Whereas in an RGB image, data is stored in terms of the red, green, and blue color values for each pixel, the YCbCr and YCrCb formats store image data by recording the luminance (Y) and chrominance (Cb, Cr) values for each pixel. The YCbCr and YCrCb formats are popular because they are used in the common JPEG picture file format.

The ability to operate on RGB, YCbCr, and YCrCb images is advantageous if image transforms are implemented on a portable device such as a digital camera, because all three formats may be used in a digital camera. This is because of the way digital images are created and processed.

For example, most digital camera image sensors are composed of individual sensor cells that are sensitive to only one of red, green, or blue light, not to light of all three colors.

Therefore, individual cells are typically deployed in a pattern, called a Bayer pattern, in which cells sensitive to green are dispersed among and alternated with cells sensitive to red and blue. In consumer products, green cells usually predominate because the human visual system is more sensitive to green, and the inclusion of more green cells tends to increase the perceived image quality. In one typical Bayer pattern, an array of 16 sensor cells may include 8 green cells, 4 red cells, and 4 blue cells arranged roughly in a checkerboard pattern. When an image is taken by a digital device that uses single-color cells in a Bayer pattern, the raw image is typically interpolated such that each pixel has a red value, a green value, and a blue value and stored, at least in an intermediate stage of processing, as an RGB image. The image may be further converted to YCbCr or YCrCb for compression and storage.

Although images in YCbCr and YCrCb formats may be directly processed by applying the transformations described above, there are some circumstances in which additional tasks may be performed, for example, with subsampled YCbCr and YCrCb images. In a subsampled image, some chrominance values are discarded or subsampled in order to reduce the size of the file. For example, in the common H2V1 YCbCr 4:2:2 format, pixel columns are subsampled, but pixel rows are unaffected. In this subsampling scheme, if the columns are numbered starting from zero, only even columns have the Cb component and only odd columns have the Cr component. Another subsampled format is the YCbCr 4:2:0 format, in which each 2×2 pixel array shares a single Cb value and a single Cr value. YCrCb format is generally the same as YCbCr, except that the order of Cb and Cr components is reversed.

The transformation methods described above may be directly applied to subsampled YCbCr and YCrCb formats, although doing so may not result in an end image with correctly alternating Cb and Cr components. To overcome this issue, a temporary unsubsampled image (YCbCr 4:4:4 or YCrCb 4:4:4) may be created from the subsampled image by considering pairs of adjacent pixels and duplicating the appropriate Cb and Cr values so that each pixel has a Cb and a Cr value. For storage purposes after transformation, the extra Cb and Cr values may be discarded. Tests performed by the inventor showed no visually perceptible differences between the processed result of an RGB image and the processed result of that same image in YCbCr and YCrCb formats.

Figure 26:
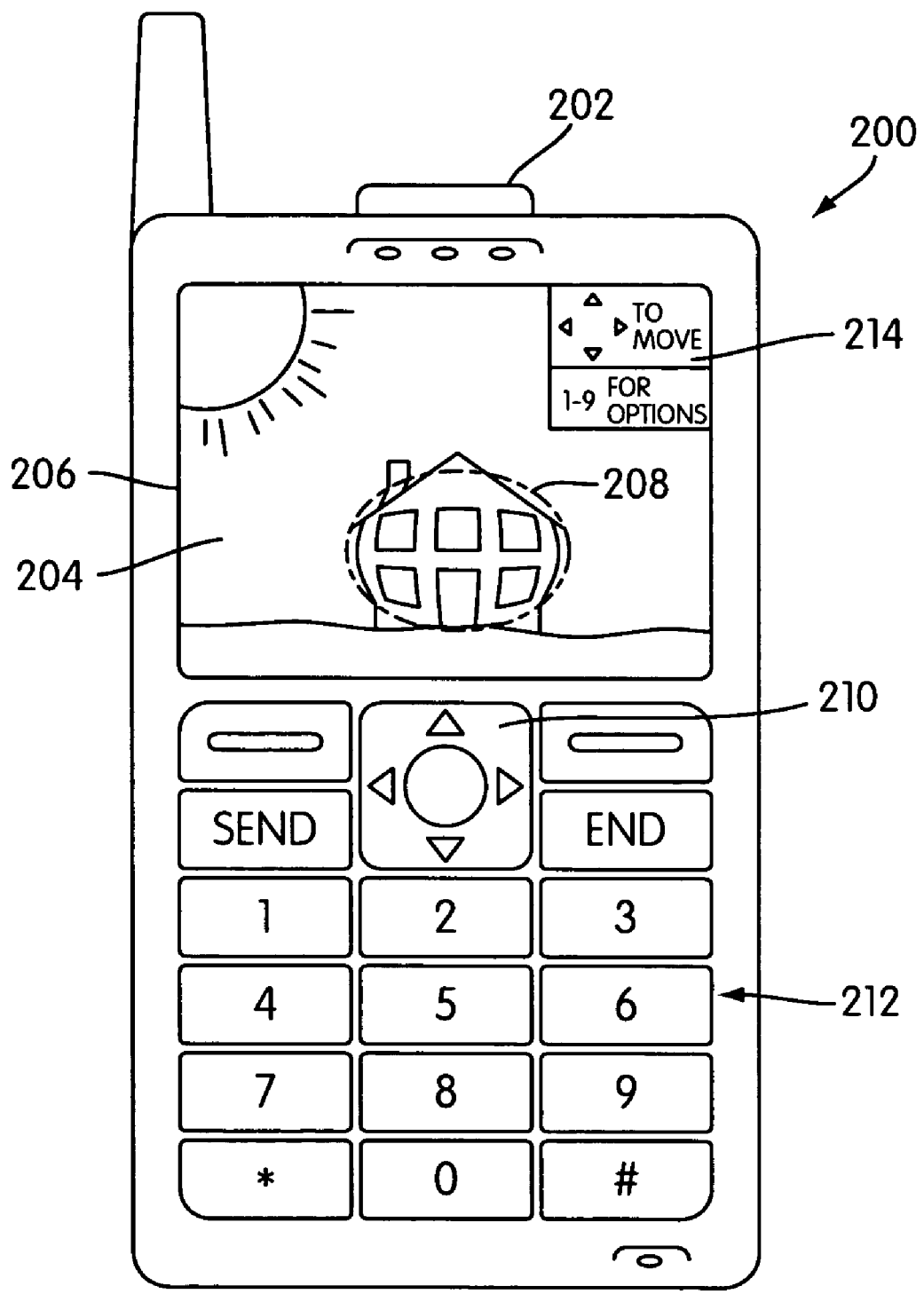
FIG. 26 is an illustration of a mobile telephone with a digital camera, illustrating the use of the transformation methods on a portable device.

FIG. 26 shows an embodiment of a mobile telephone 200 with a digital camera 202. The mobile telephone 200 and its digital camera 202 include the region of interest defining mechanism 24 and the transform device 26 of FIG. 1, or other mechanisms for performing image transformations as described herein. In typical use, a user would take a digital picture using the digital camera 202 of the mobile telephone 200, and would then use the processing capabilities of the mobile telephone 200 to perform a transformation. As shown in FIG. 26, a digital image 204 is displayed on the display screen 206 of the mobile telephone 200. (Typically, the display screen 206 is a relatively small liquid crystal display driven by graphics entity 20, although other types of display screens 206 may be used.) As shown, the image 204 has been transformed by local magnification of a region of interest 208. An overlay or pull-down menu 214 temporarily overlaid on the image 204 may provide instructions for changes in the type and magnitude of transformation. For example, the user may be instructed to use the arrow keys 210 of the mobile telephone 204 to move the region of interest 208. (If the region of interest 208 is moved, the transformation would be repeated, centered about a new focal point, by performing a method such as method 100 again.) The user may also be instructed that some combination of number/letter keys 212 can be used to change the magnification/pinch level, switch between magnification and pinch, or use both on the same image 204. (In which case, a method such as method 100 would be repeated with new parameters.) Depending on the implementation, the user may or may not be able to directly modify the values of the parameters a, k, and m; in some embodiments, the user may simply modify settings such as "magnification factor," the values for which are mapped to particular parameter values.

Depending on the implementation, the parameters of the transformation may be hard-coded or pre-set into the device, such that the transformation always results in, for example, magnification about the same predetermined point with the same radius of transformation. This may be useful in image analysis applications with a number of similar images.

An advantage of the implementation shown in FIG. 26 is that the user is presented with detail while preserving the context of the image as a whole. Whereas in a traditional linear transformation magnification scheme, the user would typically see only a portion of the image on screen and would scroll to change the visible portion, thus losing the view of the entire image, localized magnification keeps the entire image 204 visible while a desired region 208 is magnified. This may increase user efficiency by lessening the amount of time a user spends changing the magnification of the image and scrolling to see the entire image.

Figure 27:
FIG. 27 is a facial image of original size 520×390 pixels before using transformation methods according to the illustrated embodiments.
Figure 28:
FIGS. 28 and 29 illustrate the image of FIG. 27 as transformed by the transformation methods, using various parameters.
Figure 29:

Transformations may also be applied to images to create artistic effects. In addition, the illustrated transformations may be implemented on portable devices such as mobile telephone 200 for these purposes. For example, FIGS. 27-29 show the effect of these transformation methods on a facial image. FIG. 27 is an original, unmodified facial image. FIG. 28 illustrates the image of FIG. 27 after magnifying a circular region of radius 60 pixels localized around the mouth using parameters a=2, k=3, and m=0. FIG. 29 illustrates the image of FIG. 27 after pinching a circular region of radius 70 pixels localized around the nose using parameters a=2, k=1, and m=1. Combinations of transformations performed on the same image may produce additional effects.

Each element described hereinabove may be implemented with a hardware processor together with computer memory executing software, or with specialized hardware for carrying out the same functionality. Any data handled in such processing or created as a result of such processing can be stored in any type of memory available to the artisan. By way of example, such data may be stored in a temporary memory, such as in a random access memory (RAM). In addition, or in the alternative, such data may be stored in longer-term storage devices, for example, magnetic disks, rewritable optical disks, and so on. For purposes of the disclosure herein, a computer-readable media may comprise any form of data storage mechanism, including such different memory technologies as well as hardware or circuit representations of such structures and of such data.

While certain illustrated embodiments are disclosed, the words which have been used herein are words of description rather than words of limitation. Changes may be made, for example, within the purview of the appended claims.

What is claimed is:

1. An embedded device, comprising:
    a region of interest defining mechanism to define a region of interest within an image; and
    a transformation mechanism to apply a nonlinear transformation resulting in magnification or pinching to the region of interest such that magnification or pinching within the region of interest varies from a greater amount at a focal point of the region of interest to a lesser amount at an outer border of the region of interest, wherein the transformation mechanism applies a same nonlinear transformation function for the nonlinear transformation resulting in magnification or pinching, wherein the region of interest defining mechanism comprises a circular shape option to define a circular shape region of interest, and wherein the nonlinear magnification or pinching transformation performed by the transformation mechanism is represented by Equations (1) and (2) below:

$$x_{out} = \begin{cases} x_o + (x_{in} - x_o) \cdot \\ a^{(-1)^m} \cdot \left[1 - \frac{(x_{in}-x_o)^2+(y_{in}-y_o)^2}{R^2}\right]^k & \text{for } \begin{array}{l}(x_{in}-x_o)^2 + \\ (y_{in}-y_o)^2 \le R^2\end{array} \\ x_{in} & \text{otherwise} \end{cases} \quad (1)$$

$$y_{out} = \begin{cases} y_o + (y_{in} - y_o) \cdot \\ a^{(-1)^m} \cdot \left[1 - \frac{(x_{in}-x_o)^2+(y_{in}-y_o)^2}{R^2}\right]^k & \text{for } \begin{array}{l}(x_{in}-x_o)^2 + \\ (y_{in}-y_o)^2 \le R^2\end{array} \\ y_{in} & \text{otherwise} \end{cases} \quad (2)$$

wherein $x_{in}$ and $y_{in}$ are location coordinates for an input pixel within the region of interest, $x_n$ and $y_o$ are location coordinates for a center of the circular shape region of interest, R is the radius of the circular shape region of interest, $x_{out}$ and $y_{out}$ are location coordinates for an output pixel, a is a parameter indicative of the greater amount, m is a parameter indicative of whether the transformation produces magnification or pinching, and k is a parameter indicative of the degree of smoothness and continuity in an image transition region between areas of the circular shape region of interest influenced by the greater amount and areas of the circular shape region of interest influenced by the lesser amount.

2. The embedded device of claim 1, further comprising a user interface coupled to the region of interest defining mechanism.

3. The embedded device of claim 1, further comprising a graphics entity, wherein the region of interest defining mechanism and the transformation mechanism are coupled to the graphics entity.

4. The embedded device of claim 3, further comprising:
a system bus;
a main memory; and
a display screen coupled to the graphics entity;
wherein the main memory and the graphics entity are coupled to the system bus.

5. The embedded device of claim 1, wherein the embedded device is a mobile telephone.

6. The embedded device of claim 5, wherein the mobile telephone includes a digital camera.

7. The embedded device of claim 1, wherein the nonlinear transformation uses only integer arithmetic.

8. The embedded device of claim 1, further comprising a user interface to receive user selections of parameters for the nonlinear magnification or pinching transformation, the parameters comprising a parameter determining whether the transformation produces magnification or pinching and a parameter determining a magnitude of the magnification or pinching.

9. The embedded device of claim 1, wherein when the region of interest defined by the region of interest defining mechanism is smaller in dimension than the image itself, pixels not within the region of interest are not transformed by the transformation mechanism.

10. The embedded device of claim 1, wherein the region of interest defining mechanism comprises an elliptical shape option to define an elliptical shape region of interest.

11. The embedded device of claim 7, wherein the transformation mechanism performs calculations in a predetermined order of calculation so as to avoid integer overflow.

12. The embedded device of claim 1, wherein the transformation mechanism performs the magnification or pinching transformation in real time.

13. The embedded device of claim 1, wherein the transformation mechanism performs the magnification or pinching transformation in only one dimension within the region of interest.

14. The embedded device of claim 4, further comprising a display screen to display from the graphics entity a transformed image including both the region of interest with the magnification or pinching transformation and untransformed portions of the image.

15. The embedded device of claim 14, wherein the transformed image is a facial image with one or more transformed portions.

16. The embedded device of claim 9, wherein the device is adapted to perform two or more transformations on the image, the two or more transformations having the same or different parameters.

17. A computer-readable medium interoperable with a machine to:
define a region of interest within an image; and
apply a nonlinear magnification or pinching transformation to the region of interest such that magnification or pinching within the region of interest varies from a greater amount at a focal point of the region of interest to a lesser amount at an outer border of the region of interest,
wherein a same nonlinear transformation function is applied for the nonlinear transformation resulting in magnification or pinching,
wherein the region of interest is circular in shape, and
wherein the nonlinear magnification or pinching transformation is represented by Equations (1) and (2) below:

$$x_{out} = \begin{cases} x_o + (x_{in} - x_o) \cdot \\ a^{(-1)^m} \cdot \left[1 - \frac{(x_{in}-x_o)^2+(y_{in}-y_o)^2}{R^2}\right]^k & \text{for } \begin{array}{l}(x_{in}-x_o)^2 + \\ (y_{in}-y_o)^2 \le R^2\end{array} \\ x_{in} & \text{otherwise} \end{cases} \quad (1)$$

$$y_{out} = \begin{cases} y_o + (y_{in} - y_o) \cdot \\ a^{(-1)^m} \cdot \left[1 - \frac{(x_{in}-x_o)^2+(y_{in}-y_o)^2}{R^2}\right]^k & \text{for } \begin{array}{l}(x_{in}-x_o)^2 + \\ (y_{in}-y_o)^2 \le R^2\end{array} \\ y_{in} & \text{otherwise} \end{cases} \quad (2)$$

wherein $x_{in}$ and $y_{in}$ are location coordinates for an input pixel within the region of interest, $x_o$ and $y_o$ are location coordinates for a center of the region of interest, R is the radius of the region of interest, $x_{out}$ and $y_{out}$ are location coordinates for an output pixel, a is a parameter indicative of the greater amount, m is a parameter indicative of whether the nonlinear magnification or pinching transformation produces magnification or pinching, and k is a parameter indicative of the degree of smoothness and continuity in an image transition region between areas of the region of interest influenced by the greater amount and areas of the region of interest influenced by the lesser amount.

18. The computer-readable medium of claim 17, wherein said applying is performed with integer arithmetic.

19. The computer-readable medium of claim 17, wherein the tasks further comprise allowing a user to select, directly or indirectly, parameters for the nonlinear magnification or pinching transformation that determine whether the transformation produces magnification or pinching and a magnitude or power of the magnification or pinching.

20. The computer-readable medium of claim 17, wherein the region of interest within the image is smaller in dimension than the image itself and pixels not within the region of interest are not transformed.

21. The computer-readable medium of claim 17, wherein the region of interest is elliptical in shape.

22. The computer-readable medium of claim 18, further interoperable with a machine to perform said applying in a predetermined order of calculation so as to avoid integer overflow.

23. The computer-readable medium of claim 17, wherein the nonlinear transformation is performed in real time.

24. The computer-readable medium of claim 17, wherein the computer is an embedded device.

25. The computer-readable medium of claim 24, wherein the embedded device is a mobile telephone.

26. The computer-readable medium of claim 25, wherein the mobile telephone includes a digital camera.

27. The computer-readable medium of claim 25, wherein the mobile telephone has an integer microprocessor.

28. A mobile telephone, comprising:
a receiver/transmitter assembly;
a microprocessor;
a region of interest defining mechanism coupled to the microprocessor to define a region of interest within an image; and
a transformation mechanism coupled to the microprocessor to apply a nonlinear magnification or pinching transformation function to the region of interest such that magnification or pinching within the region of interest varies from a greater amount at a focal point of the region of interest to a lesser amount at an outer border of the region of interest, $$x_{out} = \begin{cases} x_o + (x_{in} - x_o) \cdot a^{(-1)^m \cdot \left[1 - \frac{(x_{in}-x_o)^2 + (y_{in}-y_o)^2}{R^2}\right]^k} & \text{for } (x_{in}-x_o)^2 + (y_{in}-y_o)^2 \leq R^2 \\ x_{in} & \text{otherwise} \end{cases} \quad (1)$$

$$y_{out} = \begin{cases} y_o + (y_{in} - y_o) \cdot a^{(-1)^m \cdot \left[1 - \frac{(x_{in}-x_o)^2 + (y_{in}-y_o)^2}{R^2}\right]^k} & \text{for } (x_{in}-x_o)^2 + (y_{in}-y_o)^2 \leq R^2 \\ y_{in} & \text{otherwise} \end{cases} \quad (2)$$

wherein $x_{in}$ and $y_{in}$ are location coordinates for an input pixel within the region of interest, $x_o$ and $y_o$ are location coordinates for the center of the circular shape region of interest, R is the radius of the circular shape region of interest, $x_{out}$ and $y_{out}$ are location coordinates for an output pixel, a is a parameter indicative of the greater amount, m is a parameter indicative of whether the nonlinear magnification or pinching transformation produces magnification or pinching, and k is a parameter indicative of the degree of smoothness and continuity in an image transition region between areas of the circular shape region of interest influenced by the greater amount and areas of the circular shape region of interest influenced by the lesser amount.

29. The mobile telephone of claim 28, wherein the microprocessor is an integer microprocessor.

30. The mobile telephone of claim 28, wherein the transformation mechanism applies the nonlinear transformation using only integer arithmetic.

31. Apparatus comprising:
means for defining a region of interest within an image; and
means for applying a nonlinear magnification or pinching transformation to the region of interest such that magnification or pinching within the region of interest varies from a greater amount at a focal point of the region of interest to a lesser amount at an outer border of the region of interest,
wherein the defining means uses a same nonlinear transformation function for the nonlinear magnification and pinching transformation,
wherein the region of interest is circular, and
wherein the nonlinear magnification or pinching transformation is represented by Equations (1) and (2) below:

wherein the transformation mechanism applies a same nonlinear transformation function for the nonlinear magnification or pinching transformation, wherein the region of interest defining mechanism comprises a circular shape option to define a circular shape region of interest, and wherein the nonlinear magnification or pinching transformation performed by the transformation mechanism is represented by Equations (1) and (2) below:

$$x_{out} = \begin{cases} x_o + (x_{in} - x_o) \cdot a^{\left[1 - \frac{(x_{in}-x_o)^2 + (y_{in}-y_o)^2}{R^2}\right]^k} & \text{for } (x_{in}-x_o)^2 + (y_{in}-y_o)^2 \leq R^2 \\ x_{in} & \text{otherwise} \end{cases} \quad (1)$$

$$y_{out} = \begin{cases} y_o + (y_{in} - y_o) \cdot a^{\left[1 - \frac{(x_{in}-x_o)^2 + (y_{in}-y_o)^2}{R^2}\right]^k} & \text{for } (x_{in}-x_o)^2 + (y_{in}-y_o)^2 \leq R^2 \\ y_{in} & \text{otherwise} \end{cases} \quad (2)$$

wherein $x_{in}$ and $y_{in}$ are location coordinates for an input pixel within the region of interest, $x_o$ and $y_o$ are location coordinates for the center of the region of interest, R is the radius of the region of interest, $x_{out}$ and $y_{out}$ are location coordinates for an output pixel, a is a parameter indicative of the greater amount, m is a parameter indicative of whether the nonlinear magnification or pinching transformation produces magnification or pinching, and k is a parameter indicative of the degree of smoothness and continuity in an image transition region between areas of the region of interest influenced by the greater amount and areas of the region of interest influenced by the lesser amount.

32. The system of claim 31, wherein the applying means includes means for facilitating integer arithmetic.

33. The system of claim 31, further comprising means for interfacing with a user coupled to the defining means to define the region of interest.

34. The system of claim 31, wherein the region of interest is elliptical.

35. A method comprising executing in a processor steps of:
defining a region of interest within an image; and
applying a nonlinear magnification or pinching transformation to the region of interest such that magnification or pinching within the region of interest varies from a greater amount at a focal point of the region of interest to a lesser amount at an outer border of the region of interest,
wherein a same nonlinear transformation function is applied for the nonlinear transformation resulting in magnification or pinching.
wherein the region of interest is circular in shape, and
wherein the nonlinear magnification or pinching transformation is represented by Equations (1) and (2) below:

$$x_{out} = \begin{cases} x_o + (x_{in} - x_o) \cdot a^{(-1)^m \cdot \left[1 - \frac{(x_{in}-x_o)^2 + (y_{in}-y_o)^2}{R^2}\right]^k} & \text{for } (x_{in} - x_o)^2 + (y_{in} - y_o)^2 \le R^2 \\ x_{in} & \text{otherwise} \end{cases} \quad (1)$$

$$y_{out} = \begin{cases} y_o + (y_{in} - y_o) \cdot a^{(-1)^m \cdot \left[1 - \frac{(x_{in}-x_o)^2 + (y_{in}-y_o)^2}{R^2}\right]^k} & \text{for } (x_{in} - x_o)^2 + (y_{in} - y_o)^2 \le R^2 \\ y_{in} & \text{otherwise} \end{cases} \quad (2)$$

wherein $x_{in}$ and $y_{in}$ are location coordinates for an input pixel within the region of interest, $x_o$ and $y_o$ are location coordinates for a center of the region of interest, R is the radius of the region of interest, $x_{out}$ and $y_{out}$ are location coordinates for an output pixel, a is a parameter indicative of the greater amount, m is a parameter indicative of whether the nonlinear magnification or pinching transformation produces magnification or pinching, and k is a parameter indicative of the degree of smoothness and continuity in an image transition region between areas of the region of interest influenced by the greater amount and areas of the region of interest influenced by the lesser amount.

36. The method of claim 35, wherein said applying step is performed with integer arithmetic.

37. The method of claim 35, wherein the steps further comprise allowing a user to select, directly or indirectly, parameters for the nonlinear magnification or pinching transformation that determine whether the transformation produces magnification or pinching and a magnitude or power of the magnification or pinching.

38. The method of claim 35, wherein the region of interest within the image is smaller in dimension than the image itself and pixels not within the region of interest are not transformed.

39. The method of claim 35, wherein the region of interest is elliptical in shape.

40. The method of claim 37, further including the step of applying in a predetermined order of calculation so as to avoid integer overflow.

41. The method of claim 35, wherein the nonlinear transformation is performed in real time.

\* \* \* \* \*

UNITED STATES PATENT AND TRADEMARK OFFICE
CERTIFICATE OF CORRECTION

PATENT NO. : 7,715,656 B2  
APPLICATION NO. : 11/081400  
DATED : May 11, 2010  
INVENTOR(S) : Zhou Page 1 of 1

It is certified that error appears in the above-identified patent and that said Letters Patent is hereby corrected as shown below:

Column 15, line 28, claim 1: "$X_n$" to read as --$X_o$--

Column 17, line 22, claim 24: "the computer" to read as --the machine--

Column 18, line 47, claim 31: "a" to read as -- $a^{(-1)^n}$ --

Column 18, line 50, claim 31: "a" to read as -- $a^{(-1)^n}$ --

Column 19, line 10, claim 35: "transfonnation" to read as --transformation--

Column 19, line 18, claim 35: "pinching." to read as --pinching,--

Column 20, line 14, claim 36: "perfonned" to read as --performed--

Column 20, line 19, claim 37: "powerof" to read as --power of--

Signed and Sealed this  
Twelfth Day of July, 2011

David J. Kappos  
*Director of the United States Patent and Trademark Office*